United States Patent [19]

Guglielmetti et al.

[11] Patent Number: 4,713,994

[45] Date of Patent: Dec. 22, 1987

[54] CUTTING DEVICE FOR SHEETS MADE OF PLASTIC MATERIAL

[75] Inventors: Giorgio Guglielmetti, Mondovi'; Guido Carossio, Turin; Luigi Gilli, Luserna S. Giovanni, all of Italy

[73] Assignee: Saint-Gobain Vitrage (Les Miroirs), Courbevoie, France

[21] Appl. No.: 878,440

[22] Filed: Jun. 25, 1986

[30] Foreign Application Priority Data

Jun. 25, 1985 [FR] France .............................. 85 09627

[51] Int. Cl.$^4$ ............................................. B23D 53/00
[52] U.S. Cl. ........................................ 83/71; 83/174; 83/789; 83/819
[58] Field of Search .................. 83/789, 788, 794–798, 83/801, 818, 819, 816, 817, 174, 71

[56] References Cited

U.S. PATENT DOCUMENTS

| | | | |
|---|---|---|---|
| 3,548,697 | 12/1970 | Gerber et al. | 83/925 CC |
| 3,587,378 | 6/1971 | Oppenheim | 83/71 X |
| 4,111,085 | 9/1978 | Johnson | 83/801 |
| 4,393,450 | 7/1983 | Jerad | 83/71 X |
| 4,491,047 | 1/1985 | Butkiewicz | 83/817 |
| 4,592,261 | 6/1986 | Miyaji | 83/102.1 |

Primary Examiner—Frank T. Yost
Attorney, Agent, or Firm—Oblon, Fisher, Spivak, McClelland, & Maier

[57] ABSTRACT

An automatic routing device for sheets made of plastic material utilized especially in compound panes has a cutting head with a band having a sharp edge in the form of a band saw blade. The cutting head is mounted to a structure allowing the cutting head to move along three orthogonal cartesian axes and to rotate along two orthogonal rotation axes. An electronic and numeric command and control device is provided to control the head.

14 Claims, 8 Drawing Figures

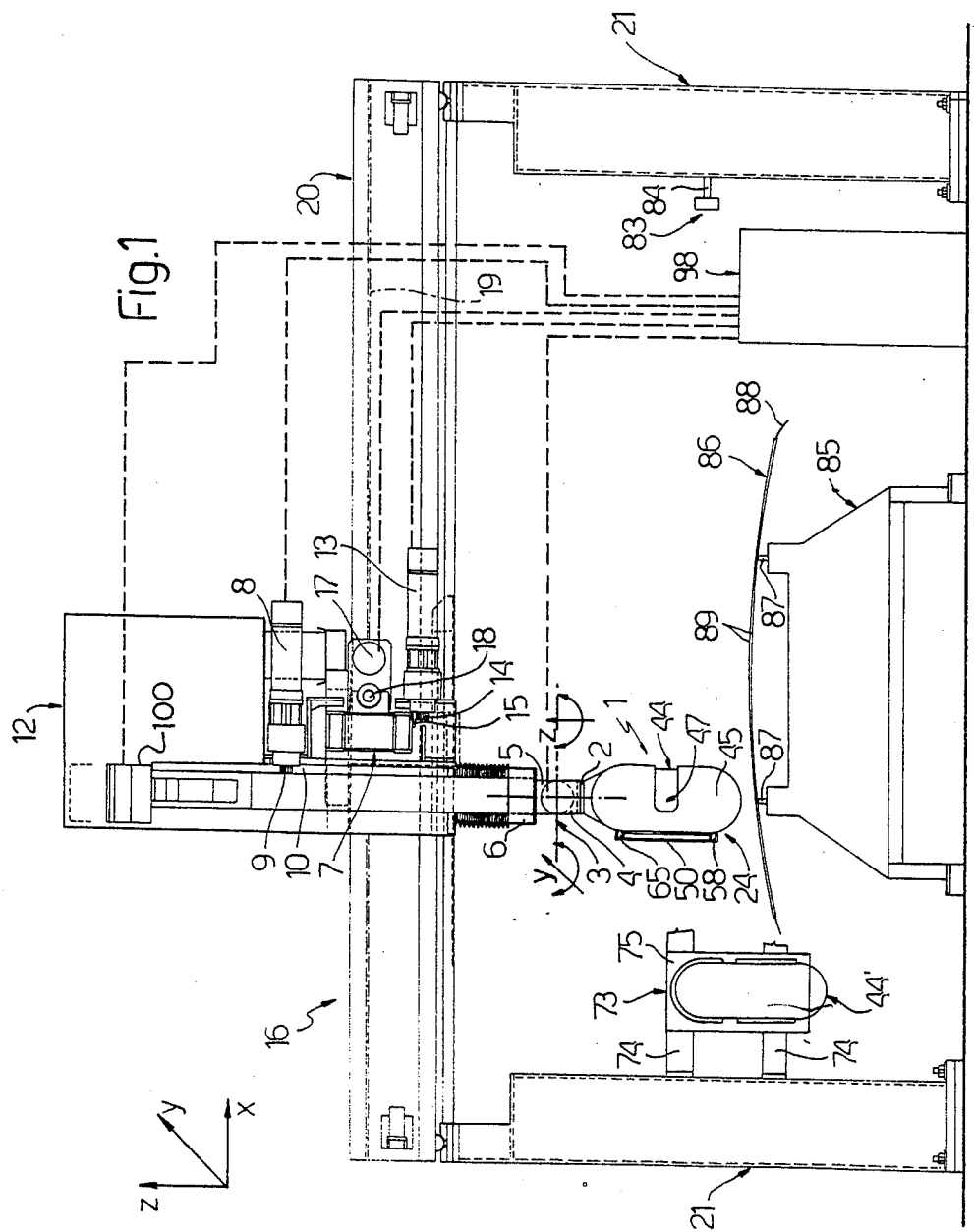

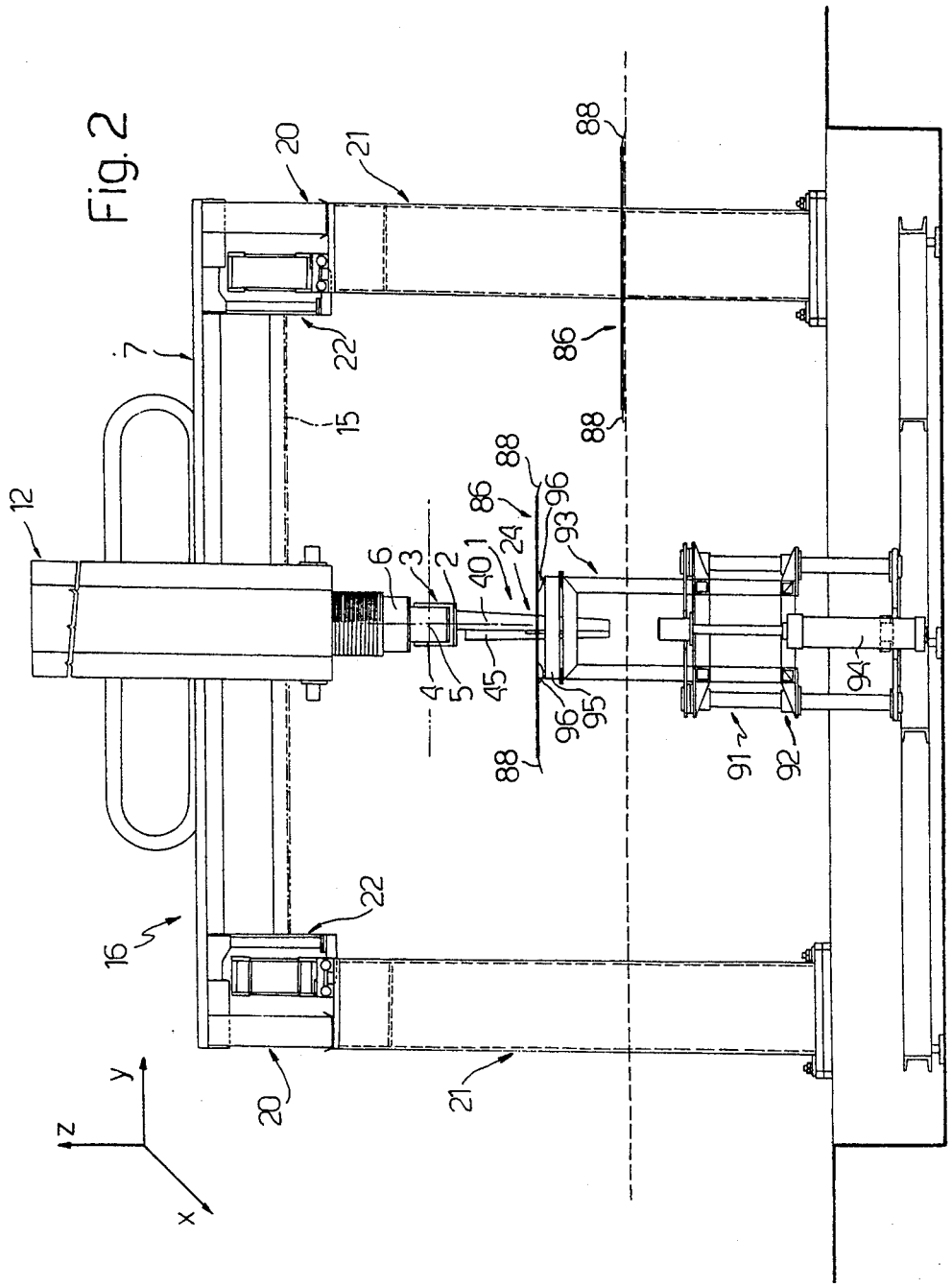

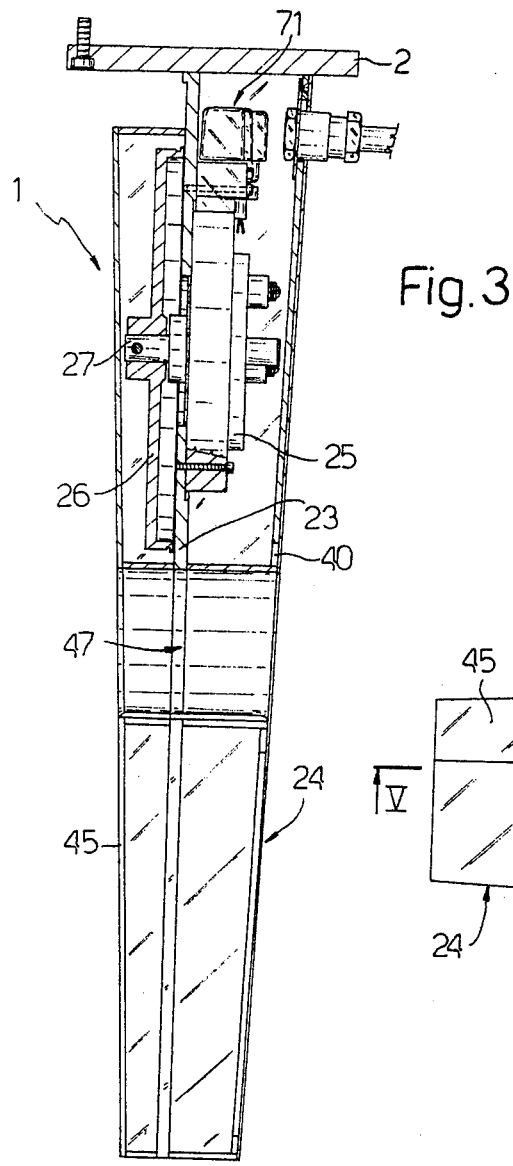
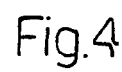
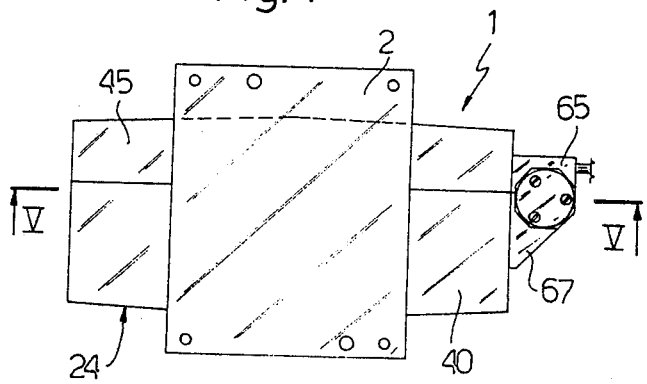
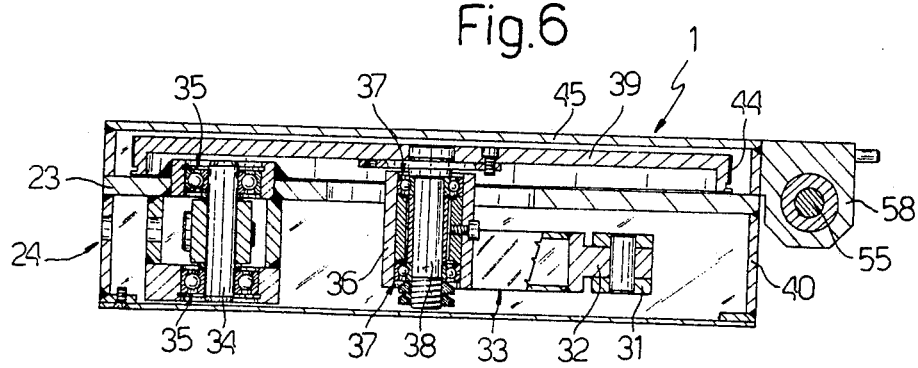

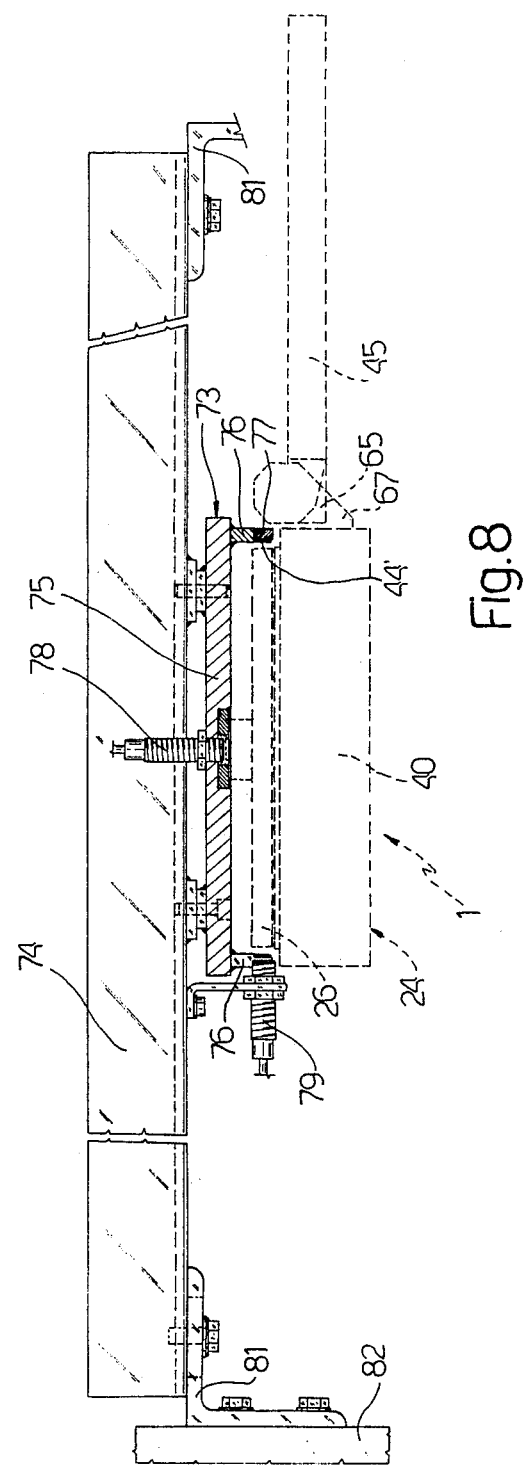

CUTTING DEVICE FOR SHEETS MADE OF PLASTIC MATERIAL

BACKGROUND OF THE INVENTION

Field of the Invention

This invention pertains to the cutting of sheets or films made of one or several layers of plastic material, especially the cutting of transparent or translucent sheets which are suitable for use in the production of compound panes. More specifically, the invention pertains to a device for cutting these sheets, temporarily or permanently assembled with other elements of the pane, by a routing operation.

Related Art

In the production of compound panes, especially safety panes made of two sheets of glass and an intermediary sheet or layer of plastic material, for example, one made of polyvinylbutyral or polyurethane, the constituent elements of the pane are assenbled by the stacking of the elements, followed by a calendering done by passing the stacked formation between press rollers, and a pressure sealing cycle.

When the elements are being stacked, the intermediary sheet of plastic material is in the form of a preform, which is generally horizontal trapezoidal, the size of which is slightly larger than that of the pane.

After the stacking, and before the calendering operations, the parts of the intermediary sheet which protrude from the edges of the pane are cut manually by routing with a metal blade, with the worker performing this routing operation keeping the blade prssed against the edge of the pane. This operation involves long and costly labor. In addition, this method can sometimes be imprecise, thus requiring the trimming of the parts of the intermediary layer still protruding from the pane, generally after the pressure sealing cycle. Another problem involved in this manual cutting is that the tool can damage areas along the edges of the glass sheets, thus embrittling the pane. Finally, the blades used tend to wear quickly and must be changed often.

Automatic cutting devices have already been described, for example in French patent publication No. 2,510,029.

SUMMARY

The present invention has at its object an improved cutting device, which is entirely automatic, perfectly reliable and which can easily be integrated into production processes for compound panes.

The device in accordance with the invention includes a cutting head endowed with a band having sharp edges in the form of a band saw blade, means to connect the cutting head to a structure which allows the cutting head to move along three orthogonal cartesian axes, connection means for allowing the head to rotate according to two orthogonal rotation axes and electronic and numeric command and control means.

In an advantageous embodiment of the cutting device, means which automatically and periodically order the cutting blade to be changed are provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a front elevational view of the cutting device.

FIG. 2 is a side view of the device shown in FIG. 1.

FIG. 3 is a partial side view of the cutting head illustrated in FIGS. 1 and 2.

FIG. 4 is a plan view of the cutting head in FIG. 3.

FIG. 6 is a section seen from plane VI—VI.

FIG. 8 is a section seen from plane VIII—VIII.

DETAILED DESCRIPTION OF THE PREFERRED EMBODIMENTS

Figure 5:
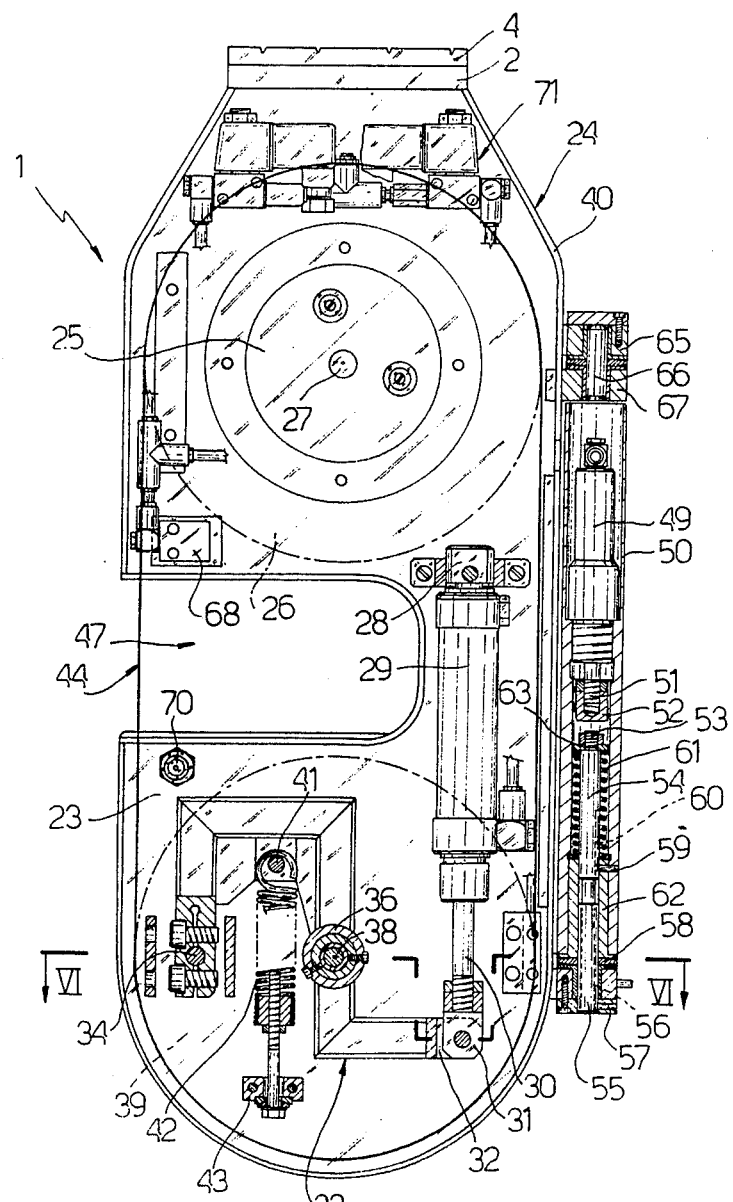
FIG. 5 is a section seen from plane V—V in FIG. 4.

As shown in FIGS. 1 and 2, the cutting head 1 has an upper plate 2, connected to a rotating joint 3, allowing this plate 2 to rotate around the y axis (in FIGS. 1 and 2, the ternary orthogonal cartesian axes x, y and z are shown to designate movements which will be described below) by use of an internal motor (not shown). Specifically, the plate 2 is connected to a U-shaped fork 4, pivotally mounted on a shaft at the lower end of an internal column 5 of a main vertical column 6 which extends along the z axis. The column 5 can turn around the z axis, with respect to a vertical slide column 6, through the intermediary of motor 100 and position command and control mechanisms of the aforementioned type. The column 6 can move vertically with respect to a horizontal beam 7, extending along the y axis, by the use of a motor 8, connected to a structure 12 supported by the beam 7, which has an output gear 9 meshing with a rack 10 attached to the column 6. The structure 12 attached to the beam 7 and housing the vertical slide column 6, on the other hand, is provided with a mechanism (not shown) to counterbalance the weight of the column 6.

The structure 12, as shown in FIG. 1, is also connected to a motor 13 which moves the structure 12 along the y axis.

Specifically, the motor 13 has an output gear 14, which meshes with a rack 15 which is fastened under the beam 7. On the beam 7 there is in turn supported a motor 17 which controls the movement of the beam 7 along the x axis, and which has an output gear 18 which meshes with a rack 19 attached to an upper portion of a beam 20 extending along the x axis and which is supported at the ends by two vertical columns 21. Carriages 22 support the horizontal beam 7 on the perpendicular beams 20 and move the beam 7 by rolling along the bottom flange of the beam 20.

As seen in FIGS. 3 to 6, the cutting head 1 has a main part 24, with a beam part 40 in the form of a box, partially laterally open, attached to the upper plate 2. This beam part 40 supports, on one of its internal walls 23, a motor 25 which is attached to the wall 23 and which rotates via its shaft 27 which extends through the wall 23, a pulley 26 fixed to the shaft 27.

In a central portion of the beam part 40, as shown in FIG. 5, one end 28 of an activation jack 29 is pivotally mounted on a shaft connected to the beam part 40. The jack 29 has a rod 30, one end 31 of which is pivotally mounted on a shaft connected at one end 32 of a profiled tubular body 33. The other end of body 33 is attached to a pivot shaft 34 which is pivotally supported on the beam part 40 by two end bearings 35 (FIG. 6). Mounted in the middle of the length of the profiled tubular body 33 is a bearing 36 which, via the intermediary of ball bearings 37, holds a movable support shaft 38 for a pulley 39, which is placed outside of beam part 40 (i.e., the shaft 38 extends through wall 23).

As shown in FIG. 5, to the profiled tubular body 33 is attached a pin 41, to which is hooked an end of a traction spring 42, the other end of which is attached to a support 43 fastened to beam part 40. Between two pulleys 26 and 39 is placed a metal, band-shaped cutting blade 44 having sharp edges, to which tension is applied by the spring 42 in opposition to the jack 29 in a manner which will be described in greater detail below. This cutting blade 44 is enclosed in the head 1 by a cover 45, which has a U-shaped opening 47, which exposes a portion of the cutting blade 44 with which the element to be cut comes into contact. A correspondingly positioned and shaped opening is provided in the beam part 40 to provide a through passage.

The opening and closing movement of the cover 45 occurs through the intermediary of a jack 49, which, as shown in FIG. 5, is housed in a cylindrical section 50 attached laterally to the beam part 40. Specifically, such a jack 49 has a movable rod 51 with a head 52 which, by linear displacement, can act on an end 53 of a thruster 54, having a lower part 55 endowed with a helicoidal channel 56. A pin 57, held by a section 58 which, as shown in FIG. 6, is connected to a lower lateral end of the cover 45, fits in the channel 56. As a result, axial movement of the thruster 54 rotates the pin 57 and the attached cover.

Also in the cylindrical section 50 is attached a pin 59 which is housed in a vertical slot 60 of the upper section of the thruster 54, to prevent the rotation thereof around its shaft. Around this upper section of the thruster 54 is placed a cylindrical spring 61, pressing with its lower end on a ring 62 coaxially positioned between the section 50 and the thruster 54, while the upper part of the spring 61 presses against a washer 63 attached to the end 53 of the thruster 54. In the upper lateral area of the cover 45, a part 65 is attached coaxially to the lower part 58, and is placed on a pivot shaft 66 which is guided by a bearing part 67 attached laterally to the beam part 40. Above the opening 47 in the beam part 40 there is attached a magnetic plate 68, ensuring the closing of the cover 45. On the beam part 40 is also mounted a proximity detector 70 which notes the opening and closing position of the cover 45.

In the upper section of beam part 40, various elements 71 are housed which distribute operating fluid for the jacks 29 and 49.

Figure 7:
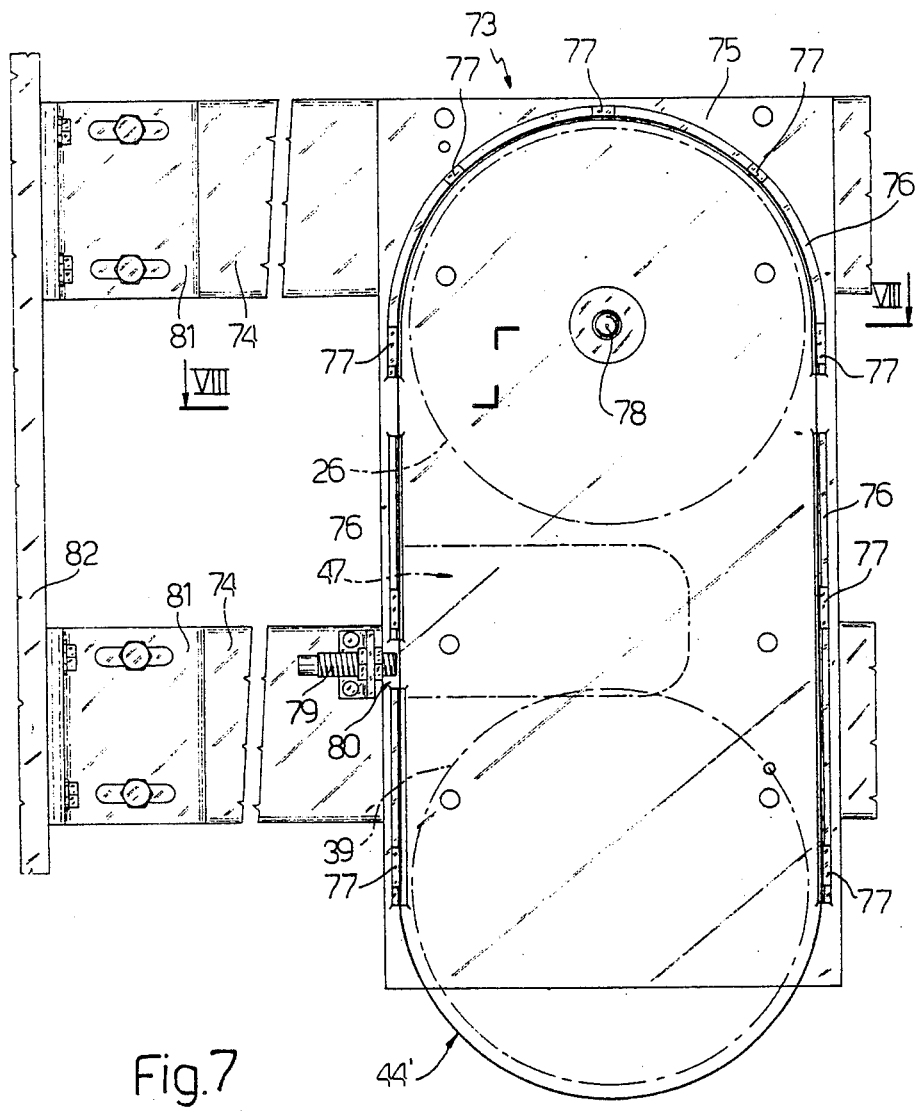
FIG. 7 is a front view of the cutting device in FIG. 1 in one form of use.

FIGS. 7 and 8 illustrate a device 73 for automatically changing the cutting blade 44. This device includes two parallel cross pieces 74, bearing a plate 75. Bars 76 which are slightly longer than the size of the cutting blade 44 when it is between the two pulleys 26 and 39 in the cutting head 1, and shaped similar thereto, are attached to the plate 75. Magnets 77 are installed on these bars 76, with a replacement cutting blade 44 being placed on the magnets. In the upper part of the plate 75, connected with the area in which the shaft 27 of the pulley 26 of the cutting head 1 arrives for the changing of the cutting blade, which will be described below and which is also shown in broken lines in FIG. 7 and 8, is placed a proximity detector 78. Another proximity detector 79 which detects the presence of a replacement blade 44 is attached to the lower cross piece 74.

The two cross pieces 74 are attached at their respective ends to corner irons 81 by means permitting the adjustment of their longitudinal position; these corner irons are fastened in turn to support columns 82 (partially shown) which themselves are attached to the columns 21 in an area accessible to the cutting head 1.

A sharpening device 83 for the cutting blade 44 is shown in FIG. 1. It comprises a sharpening wheel and is held by a support 84 which is placed in an arc between the columns 21 which is accessible to the cutting head 1. Between the columns 21, parallel to the direction of the horizontal cross piece 7 is placed a transporting device 85 for the panes 86 to be cut. Specifically, this transporting device 85 can comprise tansporting carriages having several rows of stops 87 extending parallel to the tansporting line, which support panes 86 are formed of two sheets of glass 89, between which is placed a sheet 88 of a larger size, made of plastic material, especialy polyvinylbutyral. The plastic sheet 88 protrudes from the edges of the glass sheets 89 and must be trimmed off by the cutting head 1 which is the object of this invention, by a routing operation.

In FIG. 2, the rows of stops 87 of the transporting device 85 for panes 86 are shown in broken lines. Between the columns 21, a device 91 for taking the pane 86 from the the transporting device 85 is provided. This device 91 has a base frame 92 and a central part 93 which can be raised by an operating jack 94 and which includes an upper plate 95 having support suction cups 96 positionable under the pane 86.

The various actions of displacement or rotation for the cutting head 1 are dictated by a microprocessor type control center 98 which commands and controls the functions related to the operation of the device.

The cutting head 1 and its additional related equipment operate as follows: a pane 86 having the sheet 88 to be cut by routing is moved from the transporting device 85 to the device 91 which, commanded by the control center 98, places it in a raised position with respect to the transporting device 85, as illustrated in FIG. 2, for the cutting operation. For this procedure, the control center 98 commands the movement of the cutting head 1 with a signal for displacement along 5 axes (3 displacement axis and 2 rotation axis), to cause the cutting blade 44 to follow the edge of the pane 86, which passes in the opening 47. The cutting blade 44 is moved by the pulley 26 which is driven by the motor 25. The blade is kept under tension between the pulley 26 and the pulley 39 by the action of the spring 42 which causes the profiled tubular body 33 which supports the pivot 34 to turn in the clockwise direction.

At the end of the phase in which the part protruding from the pane 86 is trimmed away from the sheet 88 to be cut, the device 91, by means of the downward movement of the jack 94, places the pane 86 back on the transporter 85, which sends it to the subsequent work phases.

Of course, the path of the cutting blade 44 around the edge of the pane 86 to be cut can be adjusted and controlled by the control center 98 after an initial run has been effected to establish its program.

After a certain number of pane 86 cutting cycles, the control center 98 can automatically order and control the approach of the cutting head 1 and the cutting blade 44 to the equipment 83 so that the sharp edge of the cutting blade 44 can be sharpened.

After a predetermined number of cutting cycles, the cutting head is automatically moved to the device 73 so that a blade 44 changing oepration can be effected in an automatic manner. The cover 45 of the part 40 is opened by the jack controlled thruster 54, which, through the use of the helicoidal groove 56 in the lower part 55 thereof, causes the rotation of the pin 57 inserted in the groove 56 and thus the rotation of the part 58 to which the pin 57 is attached; the part 58 connected to the cover 45 thus causes the cover 45 to turn to an open configuration, as illustrated in broken lines in FIG. 8.

Worn cutting blades 44 can be removed by the operation of the jack 29 which, by retracting the rod 30, exerts a counterclockwise (as seen in FIG. 5) rotation on the profiled tubular body 33 around the pivot 34, countering the elastic force of the spring 42 to thus bringing the shaft 38 of the pulley 39 towards the shaft of the upper pulley 26 for releasing the cutting blade 44. The cutting head 1, through the intermediary of the control center, is then positioned opposite the device 73 as illustrated in FIG. 8. The accuracy of this position is confirmed by the detector 78. The new cutting blade 44 held in the device 73 by magnets 77 is taken by the cutting head 1 by the activation of the jack 29 to cause the shaft of pulley 39 to move away from the axis of upper pulley 26, which exerts tension on this cutting blade 44, detaching it from the magnets 77. The control center 98 then orders the open cutting head 1 to move away from the device 73, and the cover 45 to close on the internal wall 23 of the beam part 40 through the use of the operating jack 49, which moves in the direction opposite that earlier described. As a result, the thruster 54 is offset in the upward direction by the operation of the spring 61.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An automatic sheet cutting device for cutting transparent or translucent sheets temporarily or permanently assembled with other elements of a pane, by a routing operation, comprising:
    a cutting head;
    a continuous band saw blade mounted on said cutting head;
    means for moving said blade along a path relative to said head;
    means for moving said head along three orthogonal cartesian axes;
    means for rotating said head about two orthogonal axes; and
    electronic and numeric control means for controlling said movement and rotation of said head.
2. The device of claim 1 including:
    two pulleys rotable about axes mounted on said head, said blade being wound around said pulleys and movable along said path by the rotation of said pulleys; and
    means for adjusting the position of one of said pulley axes relative to said head
3. The device of claim 2 wherein said means for adjusting includes means for elastically biasing said one of said pulley axes away from the other of said pulley axes.
4. The device of claim 3 including means for selectively moving said one of said pulley axes toward the other of said pulley axes.
5. The device of claim 4 wherein said means for selectively moving comprises a fluid jack mounted on said head.
6. The device of claim 5 wherein said head includes:
    a main part to which said blade is mounted, said main part including a beam part;
    an opening in said beam part at a position corresponding to said blade path and providing access to said blade for a workpiece to be cut;
    a cover pivotally mounted on said beam part and having an opening corresponding in shape and location to said opening of said beam part to provide access to said blade for said workpiece; and
    means for opening and closing said cover.
7. The device of claim 4 wherein said head includes:
    a main part to which said blade is mounted, said main part including a beam part;
    an opening in said beam part at a position corresponding to said blade path and providing access to said blade for a workpiece to be cut;
    a cover pivotally mounted on said beam part and having an opening corresponding in shape and location to said opening of said beam part to provide access to said blade for said workpiece; and
    means for opening and closing said cover.
8. The device of claim 3 wherein said head includes:
    a main part to which said blade is mounted, said main part including a beam part;
    an opening in said beam part at a position corresponding to said blade path and providing access to said blade for a workpiece to be cut;
    a cover pivotally mounted on said beam part and having an opening corresponding in shape and location to said opening of said beam part to provide access to said blade for said workpiece; and
    means for opening and closing said cover.
9. The device of claim 2 including:
    means for holding a replacement cutting blade in such a manner that it may be mounted on said pulleys upon the movement of said pulleys in proximity thereto; and
    means for sensing the proximity of said pulleys to said replacement blade holding means.
10. The device of claim 9 wherein said replacement blade holding means include magnetic means for holding said replacement blade.
11. The device of claim 10 including:
    means for sharpening said blade, and
    means for periodically moving said blade to said means for sharpening.
12. The device of claim 2 wherein said head includes:
    a main part to which said blade is mounted, said main part including a beam part;
    an opening in said beam part at a position corresponding to said blade path and providing access to said blade for a workpiece to be cut;
    a cover pivotally mounted on said beam part and having an opening corresponding in shape and location to said opening of said beam part to provide access to said blade for said workpiece; and
    means for opening and closing said cover.
13. The device for claim 1 wherein said head includes:
    a main part to which said blade is mounted, said main part including a beam part;
    an opening in said beam part at a position corresponding to said blade path and providing access to said blade for a workpiece to be cut;

a cover pivotally mounted on said beam part and having an opening corresponding in shape and location to said opening of said beam part to provide access to said blade for said workpiece; and
means for opening and closing said cover.

14. The device of claim 13 wherein said means for opening and closing said cover comprise:
 a fluid jack mounted on said main part; and
 means for converting a linear movement of said jack to a rotation of said cover.

* * * * *